United States Patent [19]

Dentino

[11] 3,765,017
[45] Oct. 9, 1973

[54] AMTI RANGE AMBIGUITY RESOLVER

[75] Inventor: Mauro Joseph Dentino, Placentia, Calif.

[73] Assignee: North American Rockwell Corporation, El Segundo, Calif.

[22] Filed: June 12, 1968

[21] Appl. No.: 738,722

[52] U.S. Cl. .................................. 343/7.7, 343/9
[51] Int. Cl. ......................... G01s 9/42, G01s 9/44
[58] Field of Search ....................... 343/7.7, 9, 17.1

[56] References Cited
UNITED STATES PATENTS
3,066,289  11/1962  Elbinger ............................. 343/7.7

*Primary Examiner*—Benjamin A. Borchelt
*Assistant Examiner*—G. E. Montone
*Attorney*—William R. Lane, L. Lee Humphries and Rolf M. Pitts

[57] ABSTRACT

In a pulsed energy system, employing higher PRF's for increased data rates, means for reducing the range ambiguity in moving target data associated with range time intervals in excess of the pulse repetition interval. A plurality of radar data matrix storage means is employed, each representing a like plurality of successive range trace intervals, a preselected range time increment or difference existing between successive ones of the radar data matrices. A doppler buildup at a like range bin in each of the matrices describes a moving target at less than an ambiguous range, however, a doppler buildup at a mutually exclusive range bin in each of the three matrices indicates a target in any ambiguously indicated, but determinable, range. Logic means responsive to the condition of the difference between the ambiguous range indications, relative to the preselected range difference between the matrix storage means, determines that range compensation term to be added to an indicated range for purposes of an unambiguous MTI range trace display.

6 Claims, 12 Drawing Figures

$n=0, T_{R_1} = T_{A_1} = T_{A_2} = T_{A_3}$

INVENTOR.
MAURO J. DENTINO
BY
ATTORNEY $$T_R = PRI_1 + T_{A_1}$$

$$T_R = PRI_2 + T_{A_2} = PRI_2 + T_{A_1} - \Delta T$$

$$T_R = PRI_3 + T_{A_3} = PRI_3 + T_{A_1} - 2\Delta T$$

$n=1$
$$T_{A_1} = T_{A_1}$$
$$T_{A_2} = T_{A_1} - \Delta T$$
$$T_{A_3} = T_{A_1} - 2\Delta T$$

AMTI RANGE AMBIGUITY RESOLVER

CROSS REFERENCES TO RELATED APPLICATIONS

1. U. S. Patent Application Ser. No. 391,073 filed Aug. 18, 1964, by Forest J. Dynan, et al, for AMTI Radar System.
2. U. S. Patent Application Ser. No. 639,238 filed May 17, 1967, by James A. Moulton for Range-Gated Moving Target Signal Processor.

BACKGROUND OF THE INVENTION

In the airborne application of directionally-ranging pulsed energy systems, such as radar systems, it is often desired to detect and locate small moving targets against a large clutter background. Where such a moving target is moving radially of the radar system relative to the clutter background, such detection of the target is sought by means of the difference in the respective doppler shifts of the echo return signals from such target and the clutter background, as is well understood in the art. Descriptions of such doppler processing techniques for coherent and non-coherent radars may be found in U. S. Pat. No. 3,341,847 issued to W. R. Fried, et al, for Platform Motion Compensation of a Coherent MTI System and in U. S. Patent Application Ser. No. 391,073 filed Aug. 18, 1964, by F. J. Dynan, et al (now U.S. Pat. No. 3,408,647), and in U. S. Patent Application Ser. No. 639,238 filed May 17, 1967, by James A. Moulton, both of which applications are assigned to North American Aviation, Inc., now known as North American Rockwell Corporation, assignee of the subject invention.

As disclosed in the above-noted U. S. Pat. No. 3,408,647, such doppler processing involves the storage of a radar data matrix of the clutter-referenced range trace signal or each return of a preselected number of successive pulse repetition intervals. Such clutter-referenced data matrix is alternatively referred to herein as a doppler map for the reason that by cross-scanning or doppler integration of such matrix by sequentially scanning a like range bin or portion of successive ones of the stored range trace signals, the doppler content at such range bin may be recovered, selective bandpass (doppler) filtering being employed to reject the clutter content thereof.

An inherent limitation in such doppler processing is the existance of blind speeds or target velocities at which targets may not be detected, due to such speeds being represented by doppler frequencies lying within the bandwidths of the radar pulse repetition frequencies which are rejected by the upper bandpass limit of the doppler filter. Another limitation inherent in a conventional AMTI radar system is the limited data rate imposed by the required "dwell time" to obtain enough samples or range trace signals from which to satisfactorily construct the doppler map and recover the moving target signal, free of clutter.

Increasing the pulse repetition interval of the pulsed energy system would increase the rate at which data may be obtained from a small target as to allow improved detection thereof: improvement in target signal-to-noise ratios, improvement in doppler processing rates, and reduction of blind velocity regions. Where the pulse repetition frequency is varied, the blind speed region may be further reduced. However, where the pulse repetition intervals (PRI's) of such increased pulse repetition frequencies (PRF's) are much less than the nominal or maximum intended range of the radar, the target returns will be ambiguous in range. In other words, the received echo of a transmitted pulse, representing the target return, will occur during other than the pulse repetition interval immediately subsequent to such pulse, whereby the determination of the apparent range time occurrence of the target return within that pulse repetition interval in which it is received will not be indicative of the true range of the target.

Prior art means for resolving the range time ambiguities in pulsed energy systems employing increased PRF's have included the use of a frequency-hopping transmitter and an associated plurality of switched narrow bandpass the receivers, a given one of the receivers being switched-on for a preselected interval in synchronism with the corresponding discrete transmitter frequency, as taught for example in U. S. Pat. No. 2,817,832 issued to R. H. Mathes for Multiple Sweep. However, such arrangement employs several separately pulsed transmitters of different frequencies and parallel receiver channels, and does not comprehend the use of a single-frequency transmitter and single channel receiver. Nor does such technique relate to either doppler-processing of such signals by means of a single doppler bandpass filter of the variation of PRF to reduce blind speed regions.

In other words, the prior art, in providing either doppler processing or multiple sweep (higher PRF) systems for enhancing detection of small moving targets, yet does not provide means for advantageously combining these functions.

SUMMARY OF THE INVENTION

By means of the concept of the subject invention, the several features of doppler processing and multiple PRF's at increased rates are combined to effect improved detection of small moving targets while resolving range-ambiguities and reducing blind speed regions.

In a preferred embodiment of the inventive concept, there is provided a pulsed energy system sequentially employing at least two higher PRF's for increased data rates. There is further provided means, including doppler processing, for reducing the range ambiguity in moving-target data associated with range time intervals in excess of the pulse repetition intervals. A plurality of radar data matrix storage means is employed, each representing a like plurality of successive range trace intervals, a preselected range time increment or difference existing between successive ones of the radar data matrices. A doppler buildup at a like range bin in each of the matrices describe a moving target at less than an ambiguous range; however, a doppler buildup at a mutually exclusive range bin in each of the three matrices indicates a target in any ambiguously indicated, but determinable, range. Logic means responsive to the condition of the difference between the ambiguous range indications, relative to the preselected range difference between the matrix storage means, determines that range compensation term to be added to an indicated range for purposes of an unambiguous range trace display.

Accordingly, it is an object of the subject invention to provide means for enhanced detection of small moving targets.

It is another object of the invention to provide means for reducing the range ambiguities associated with utilization of higher PRF's in a pulsed energy system;

It is a further object of the invention to reduce the blind speed regions associated with doppler-processing in a moving target indicator type pulsed energy system.

Still another object of the invention is to combine the use of at least two higher PRF's and doppler processing techniques to enhance detection of small moving targets and reduce both blind speed regions and range ambiguities.

These and other objects of the invention will become apparent from the following description, taken together with the accompanying drawings, in which:

BRIEF DESCRIPTION OF THE DRAWINGS

Referring to FIG. 1, there is illustrated in block diagram form a pulsed energy system embodying the inventive concept. There is provided a radar transmitter 10 having a gated system trigger input from a mutually exclusive one of at least two pulse repetition frequency sources 11, 12 and 13. Each such source of a mutually exclusive pulse repetition frequency may be comprised of countdown means 19 commonly responsive to a master clock 14 or the like. The system trigger input 15 of transmitter 10 is gatingly coupled to sources 11, 12 and 13 by means of gates 16, 17 and 18, each of which gates has a gate control input to count-down means 19.

Figure 1:
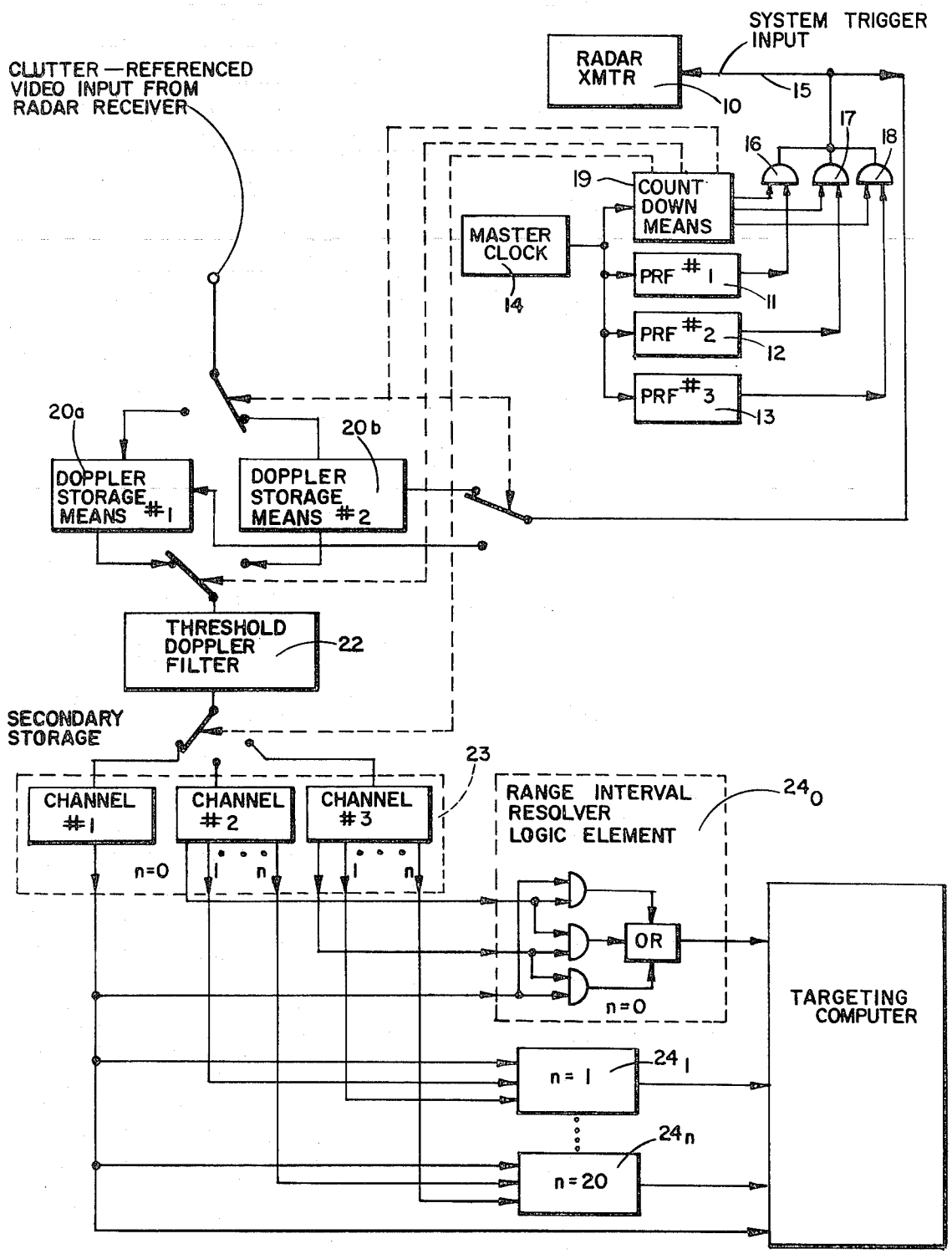
FIG. 1 is a block diagram of a system embodying the inventive concept.
Figure 2:
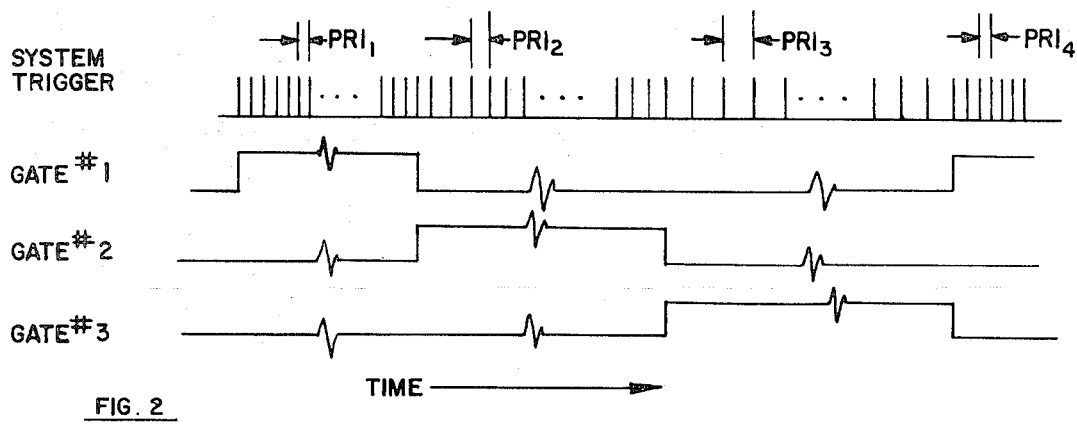
FIG. 2 is a family of representative time histories of the response of the multiple PRF transmitter arrangement of FIG. 1.

In normal operation of the transmitter 10 of FIG. 1, the system trigger input 15 of transmitter 10 is responsively coupled to the output of each of sources 11, 12 and 13 in sequence, each source being coupled for a preselected number (say, 250) of pulse repetition intervals, as shown by the representative time history of FIG. 2.

The echoes of the transmitted pulse received during the gating interval associated with each PRF, are clutter-referenced (by means well understood) and then written into or stored by doppler storage means 20a or 20b as a data matrix or doppler map of successive range trace signals, and then cross-read at the output of such storage means, and doppler-filtered by filter 22. Such filter may also include thresholding to clip those signal levels lying within the filter bandwidth and representing noise. In practice, two doppler storage means 20a and 20b would preferably be employed: one to be written into with range trace data received during the current period that a given PRF is utilized by transmitter 10, the write-in sweep of such doppler storage means being synchronized with the transmitter pulse repetition interval; the "read-out" of such doppler map (in storage 20a) is made during the subsequent interval that the next PRF is utilized by transmitter 10, while the range trace data received during such subsequent interval (at a different PRF) is being written into the second doppler storage means 20b, in synchronism with the new transmitter pulse repetition interval. Such doppler storage and doppler filtering, including the duplexed doppler storage, is described in the above-noted U. S. application Ser. No. 391,073 filed Aug. 18, 1964, by Forest Dynan et al. (now U.S. Pat. No. 3,408,647).

The thresholded and clutter-free reconstructed range-trace output of the doppler storage means for these successive pulse repetition intervals associated with a given PRF is then stored in a mutually exclusive storage channel of multiple channel secondary storage means 23. When a doppler-filtered range trace signal for each successively-employed PRF is then stored in an associated storage channel of multiple channel secondary storage means 23, the range trace data in each channel is correlated with that stored in the other channels by means of a plurality of range interval resolver logic elements 24.

The utilization of the secondary storage and logic means to resolve ambiguous range indications may be more fully appreciated from a consideration of the nature of such ambiguous intervals, as illustrated in FIGS. 3, 4a, 4b, 4c, 5, 6a, 6b, 6c, 7 and 8.

Figure 3:
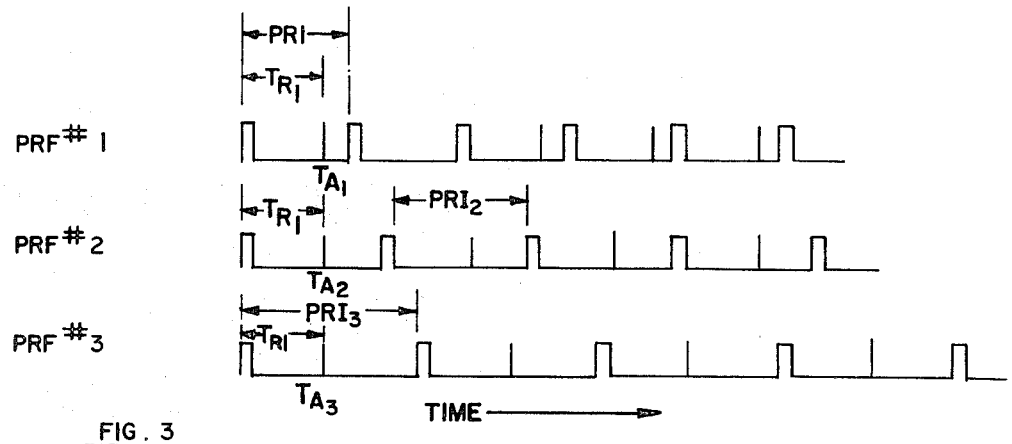
FIG. 3 is a family of representative time histories of the response of the system of FIG. 1 to a target at a preselected non-ambiguous range for each of the several pulse repetition frequencies employed.
Figure 4A:
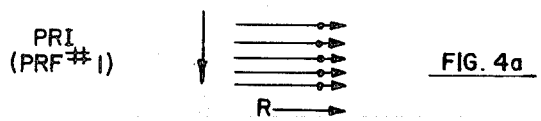
FIGS. 4a, 4b and 4c are representative doppler maps constructed for the system responses of FIG. 3 for each of the pulse repetition frequencies employed.
Figure 4B:
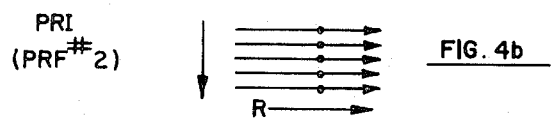
Figure 4C:
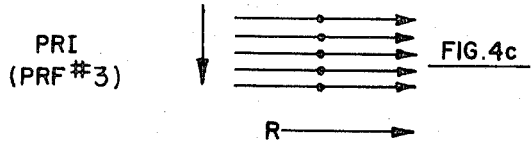

FIG. 3 illustrates three exemplary time histories of the response of a radar system, pulsed at each of three different pulse repetition frequencies, in detection of a target at a range-time $T_{R1}$ within the smallest ($PRI_1$) of the three pulse repetition intervals employed. Because the target range time is less than the smallest of the pulse repetition intervals employed, it is clear that such target return is also within the other pulse repetition intervals utilized ($PRI_2 = PRI_1 + \Delta T$ and $PRI_3 = PRI_1 + 2\Delta T$). Therefore, the apparant target return time $T_{A1}$, $T_{A2}$ and $T_{A3}$ observed for a respective one of the three pulse repetition intervals is equal to the true target return time $T_{R1}$. In other words, the apparent range time interval observed is not unambiguous. Accordingly, the doppler read-out of the doppler map constructed for each of such three PRF's will provide a reconstructed range trace signal demonstrating a target return at a common range interval ($T_{R1} = T_{A1} = T_{A2} = T_{A3}$), as shown in FIGS. 4a, 4b and 4c.

If, however, such target return (in response to a transmitted pulse) occurs in a pulse repetition interval subsequent to the pulse repetition interval associated with such particular transmitted pulse, then the indicated range time $T_A$ is ambiguous, in that it is indicative of a target range time $T_R = nPRI + T_A$, where $n$ is an integer number. The second pulse repetition interval following the transmitted pulse is thus a first ($n = 1$) ambiguous interval, while the ($n + 1$) pulse repetition interval is the nth ambiguous interval. (The first pulse repetition interval following the transmitted pulse is of course the ($n = 0$) ambiguous, or non-ambiguous, interval).

Figures 5, 6A, 6B, 6C:
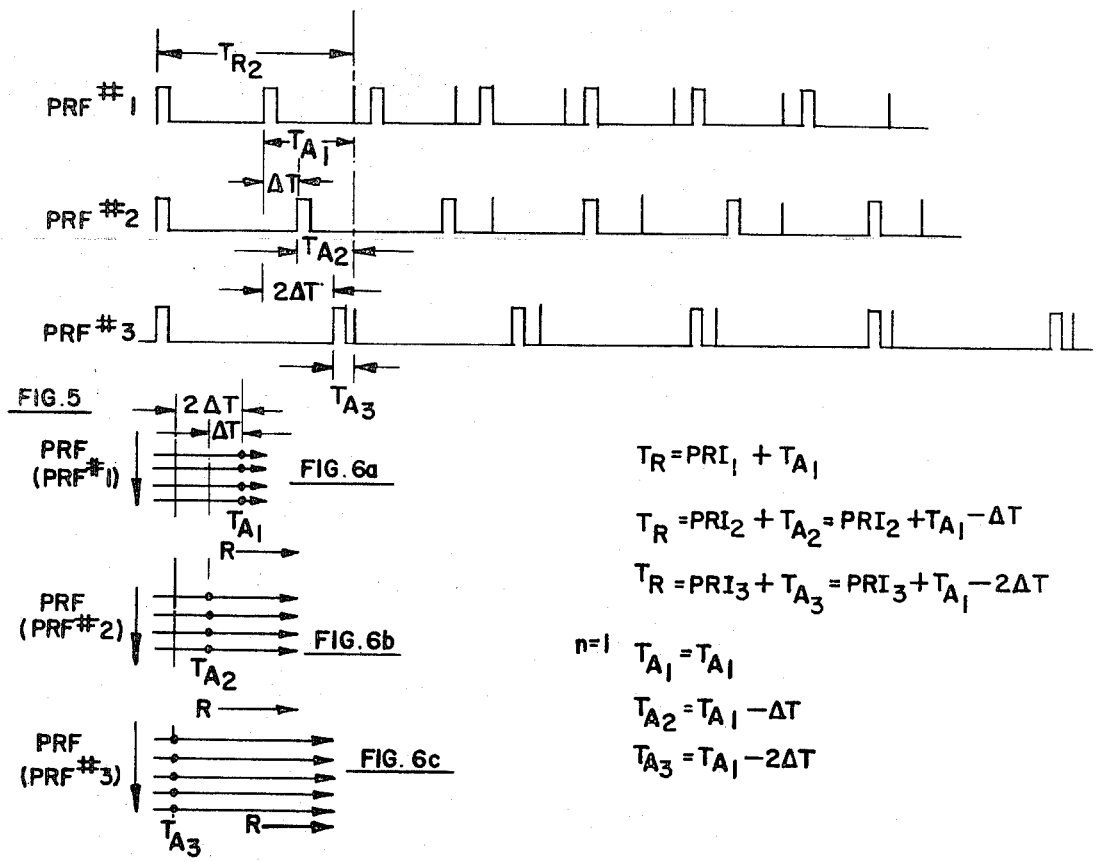
FIG. 5 is a family of representative time histories of the response of the system of FIG. 1 to a target at a preselected range within a first ambiguous interval, for each of the several pulse repetition frequencies employed.
FIGS. 6a, 6b and 6c are representative doppler maps constructed for the system responses of FIG. 5 for each of the pulse repetition frequencies employed.

For example, where the target range time $T_{R2}$ is observed as a target return occurring in the second pulse repetition interval following the transmitted pulse, as shown in FIG. 5, then the indicated range times $T_{A1}$, $T_{A2}$ and $T_{A3}$ for the several pulse repetition intervals (at which a doppler build-up will be observed, as shown in FIG. 2, 6a, 6b and 6c, in response to such target, will be different:

$T_R = PRI_1 + T_{A1}$
$T_R = PRI_2 + T_{A2} = (PRI_1 + \Delta T) + (T_{A1} - \Delta T)$
$T_R = PRI_3 + T_{A3} = (PRI_1 + 2\Delta T) + (T_{A1} - 2\Delta T)$ or, for the ambiguous interval, n = 1:

$T_{A1} = T_{A1}$
$T_{A2} = T_{A1} - \Delta T$
$T_{A3} = T_{A1} - 2\Delta T$

Where, for the least pulse repetition interval utilized, $PRI_1$, the apparent target range time $T_{A1}$ is greater than the range time increment difference ($n\Delta T$) between such pulse repetition interval and a successive one, then the expressions for the apparent target range are related in terms of the number $n$ of ambiguous pulse repetition intervals and such range time increment:

$T_{Rn} = nPRI_1 + T_{A1}$
$T_{Rn} = nPRI_2 + T_{A2} = n(PRI_1 + \Delta T) + T_{A1} - n\Delta T$
$T_{Rn} = nPRI_3 + T_{A3} = n(PRI_1 + \Delta T) + T_{A1} - 2n\Delta T$ or, for the ambiguous interval, $n$:

$T_{A1} = T_{A1}$
$T_{A2} = T_{A1} - n\Delta T$
$T_{A3} = T_{A1} - 2n\Delta T$

Figure 7:
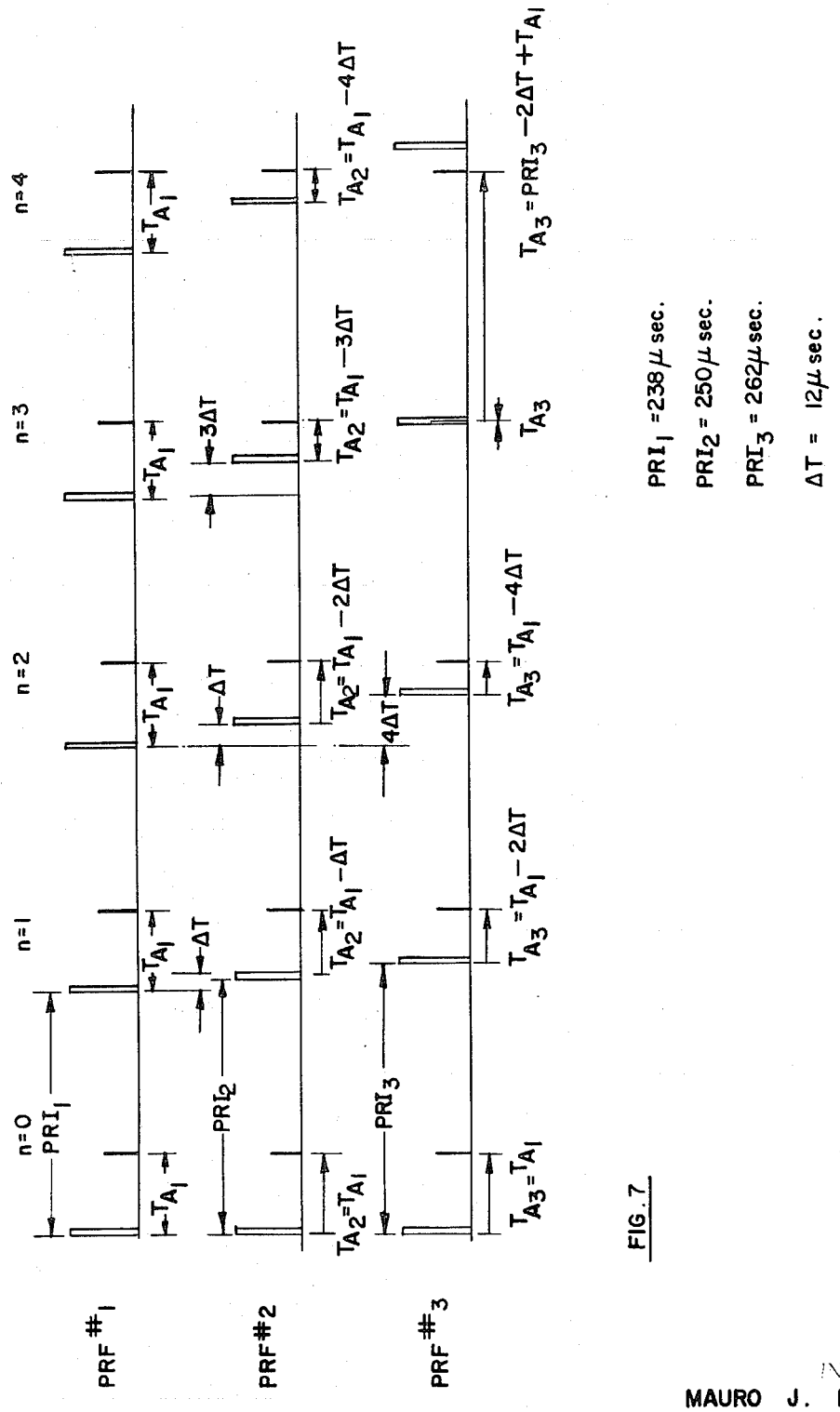
FIG. 7 is a family of representative time histories of the response of the system of FIG. 1 to a plurality of targets, each occurring within a mutually exclusive one of successive ambiguous range intervals, for each of the several pulse repetition frequencies employed.

Such relationship is more clearly indicated in the composite diagram of FIG. 7 in which the exemplary response to five targets is displayed for each of three pulse repetition intervals (where $PRI_1 = 238$ $\mu$sec, and $\Delta T = 12$ $\mu$sec), each of the five targets returns occurring in a mutually exclusive one of five successive ambiguous intervals $n = 0, 1, 2, 3,$ and $4$). It is to be appreciated, then, that if the read-outs from the several channels of the multiple channel storage means 24 of FIG. 1 are appropriately time-phased in relation to each other, so as to place in registry the corresponding doppler-processed target signals from a single common target, then the true range time of such target may be determined from such time-phase relation.

For example, if the read-out of the range trace signal from the second channel of secondary storage means 24 (of FIG. 1) is delayed by $\Delta T$, relative to that of channel 1, then a target echo occurring in the first ambiguous interval ($n = 1$, in FIG. 7) of both channels 1 and 2 (i.e., for PRF's No. 1 and No. 2) would occur simultaneously or in registry. In other words, a delay $\Delta T$ is added to the second channel apparent target range time $T_{A2}$ (in FIG. 7), whereby the second channel target signal occurs simultaneously with the first channel target signal for targets detected in the first ambiguous range interval;

$\Delta T + T_{A2} = \Delta T + (T_{A1} - \Delta T) = T_{A1}$

Accordingly the true target range time is determined as the sum of the apparent range time and such number ($n = 1$) of ambiguous range intervals:

$T_R = nPRI_1 + T_{A1} = PRI_1 + T_{A1}$

It is to be further appreciated that the true range time $T_R$ for any ambiguously indicated target may be generally determined as ($nPRI_1 + T_{A1}$), where n is the integer multiple of delay $\Delta T$ employed to effect registry between corresponding target signals read-out of channels 1 and 2 of storage means 24 (in FIG. 1). Where multiple channel secondary storage means 24 is comprised of magnetic storage means, such time delays ($\Delta T$, $2\Delta T$...$n\Delta T$) may be provided, for example, by suitable spacing of each of a plurality of read heads relative to a reference read-out position of a storage drum, each spaced read-head for the second storage channel corresponding to a mutually exclusive one of such delays. Coincidence gating means or AND-type logic gates may be employed to determine the coincidence of the occurrence of a target signal read-out on channel No. 1 of storage means 24 (in FIG. 1) and the occurrence of a target signal read-out at one of the read heads of second channel No. 2.

Where the apparent target range time $T_{A1}$ is small enough, and the true range time ($nPRI_1 + T_{A1}$) is great enough, the number n of ambiguous intervals involved in terms of $PRI_1$ (for operation of the radar at PRF No. 1) may be different than the number associated with $PRI_2$ (for operation of the radar at PRF No. 2). Such result is referred to herein as fold-back, and is indicated in FIG. 7 for PRF No. 3 for the target at ambiguous range interval $n = 3$ (or $T_R = 3PRI_1 + T_{A1}$), the target return for the PRF No. 3 transmitter pulse (for interval $n = 3$) occurring coincidentally with the PRF No. 3 transmitter pulse. For the illustrated target range time $T_R = 4PRI_1 + T_{A1}$, occurring at ambiguous interval, $n = 4$ for PRF No. 1, the corresponding PRF No. 3 target range time $T_{A3}$ occurs in the third ambiguous interval. In other words, for a given apparent range time $T_{11}$ occurring for PRF No. 1 in a successive one of $n$ ambiguous range intervals, the corresponding response to PRF No. 2 or PRF No. 3 will be a successive shorter $T_{12}$ or $T_{13}$ within a like ambiguous range interval, until such apparent range interval for such higher PRF approaches zero. In the event of such latter limiting case, the target signal for an even more distant target will appear in that ambiguous interval for such higher PRF as that ambiguous interval preceding the one in which it appears at the lower or reference PRF. Thus, the like $n$ readhead for channel 2 or 3 corresponding to that $n$-interval of $PRI_1$ for which an apparent target is detected, will not provide a second target signal read-out coincident with than in Channel 1 for resolving the range ambiguity.

Accordingly, a third PRF (PRF No. 3) and associated doppler storage and secondary storage therefor may be employed by range interval resolver logic to overcome such foldback. In other words, any two of the three channels may be correlated. In addition to overcoming such foldback effect, the use of such additional PRF aids in reducing blind frequency effects occurring at either one of the other two PRF's, which mask the target and prevent target correlation for range ambiguity resolution.

Such ambiguity resolution data ($n\Delta T$) and the apparent target range time data, $T_A$ may be employed by a targeting computer to indicate the true range of the target ($T_R = n\Delta T + T_A$).

Figure 8:
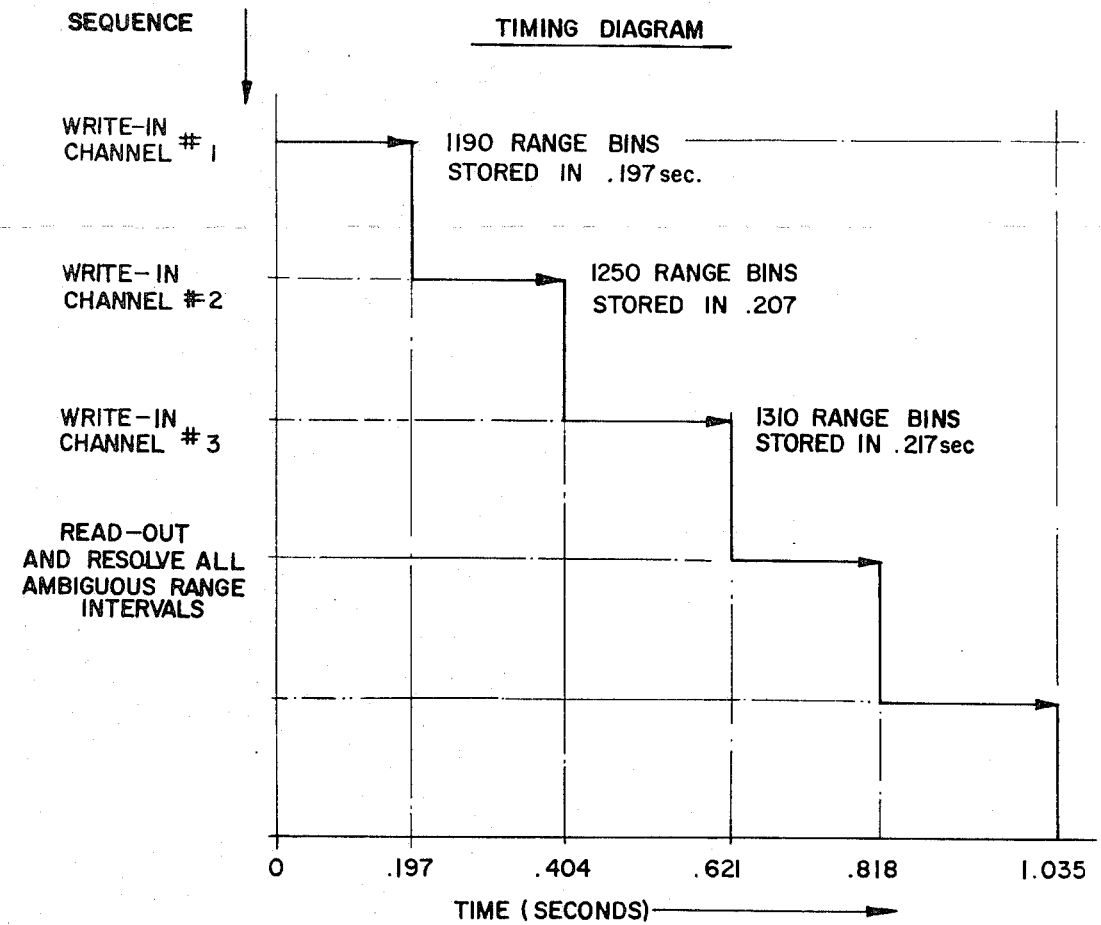
FIG. 8 is a representative timing diagram, illustrating the sequence of cooperation among the secondary storage channels and range interval resolver logic means.

The sequence of secondary storage write-in, read-out and the resolution of range ambiguity by the arrangement of FIG. 1 for those exemplary pulse repetition frequencies indicated in FIG. 7 is depicted on FIG. 8, indicating a representative processing interval of 1.035 seconds.

Thus, there has been described correlation means for time-domain correlation of a pair of doppler-processed range trace signals, each representing a different pulse repetition interval, the correlation being performed as a function of discrete range time $n\Delta T$, where $n$ is an integer including zero and $\Delta T$ is the range time difference between the respective pulse repetition intervals. Therefore, an improved AMTI range ambiguity resolver has been described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulsed energy system employing at least a pair of pulse repetition frequencies, means for resolving an ambiguous range indicative of a detected moving target and comprising doppler processing means responsive to target echo signals received by a receiver of said system for providing at least a pair of clutter-free range trace signals, each said range trace signal indicative of the system response to a mutually exclusive one of said pulse repetition frequencies; and correlation means for time-domain correlation of said pair of range trace signals as a function of discrete time $n\Delta T$, and comprising a plurality of coincidence detection means for comparing one of said range trace signals and a delayed second one of said range trace signals, a successive one of said plurality of coincident detection means employing a successively increased delay ($n\Delta T$) of said delayed second range trace signal, where n is an integer number including zero and where $\Delta T$ corresponds to the range time difference between the respective pulse repetition intervals associated with said pair of pulse repetition frequencies.

2. The device of claim 1 in which said doppler processing means includes a pair of time-duplexed doppler storage means, each arranged to be responsive to the pulse repetition interval of a selected one of said system pulse repetition frequencies for providing a doppler map; and doppler filter means having an input arranged to be responsive to an alternate one of said doppler storage means for providing a clutter-free range trace output signal.

3. The device of claim 1 in which said correlation means includes multiple channel secondary storage means responsively coupled to an output of said doppler processing means, each channel of said storage means being responsive to the clutter-free range trace signal associated with a mutually exclusive one of said pulse repetition frequencies, for providing concomitant read-out of said two range trace signals, one of said range-trace signals being read-out at successive delays $n\Delta T$ relative to the other of said range trace signals, where n is an integer number including zero and $\Delta T$ corresponds to the range time difference between the pulse repetition intervals associated with said pair of pulse repetition frequencies; and coincidence gate logic means responsive to said read-out of one of said channels and respective ones of said delayed readouts of the other of said channels for indicating that integer number ($n$) of ambiguous pulse repetition intervals associated with the apparent range time for a detected moving target.

4. The device of claim 1 in which said correlation means includes multiple channel secondary storage means responsively coupled to an output of said doppler processing means, each channel of said storage means being responsive to the clutter-free range trace signal associated with a mutually exclusive one of said pulse repetition frequencies, for providing concomitant read-out of said two range trace signals, range-time registration of one of said range-trace signals being successively delayed $n\Delta T$ relative to the other of said range trace signals, where n is an integer number including zero and $\Delta T$ corresponds to the range time difference between the pulse repetition intervals associated with said pair of pulse repetition frequencies; and ambiguity resolver logic means comprising a plurality ($n + 1$) of coincidence gates each responsive to said read-out of one of said channels and to a mutually exclusive of said delayed read-outs of the other of said channel for indicating that integer number ($n$) of ambiguous pulse repetition intervlas associated with the apparent range time for a detected moving target.

5. In a pulsed energy system employing at least a pair of pulse repetition frequencies and adapted for substantially clutter-referenced detection of moving targets, means for resolving the ambiguous range indication of a detected moving target occurring at a range greater than that corresponding to the least pulse repetition interval provided by said pulse repetition frequencies, and means responsive to a clutter referenced video receiver output of said system for providing that doppler map associated with each of said pulse repetition frequencies, a preselected range time increment difference ($\Delta T$) existing between the pulse repetition intervals of at least two of said pulse repetition frequencies;

a thresholded doppler bandpass filter responsive to a doppler read-out of successive ones of said doppler maps for providing a substantially clutter-free range trace output;

multiple-channel recording means responsively coupled to an output of said filter for separately recording the successive clutter-free range-trace outputs, a first channel of said recording means having a reference read head, and a successive channel of said recording means having a preselected number of regularly spaced read heads, the spacing between adjacent readheads corresponding to a range time increment of said recorded range trace outputs, the phase-spacing of a reference read head on said successive one ($n$) of said channels differing from that of said first channel by an amount corresponding to the preselected range time incremental difference ($n\Delta T$) therebetween; and a like plurality of logic means as said preselected number of read heads per successive channel, each logic means responsive to said read-head of said first channel and to a mutually exclusive one of the read heads of a successive channel of said recording means for providing a two-state logic output indicative of the coincidence of any two of the inputs thereto from said multiple channel recording means for indicating that integer number ($n$) of ambiguous pulse repetition intervals associated with the apparent range time $T_A$ of a detected moving target.

6. In a pulsed energy system employing at least a pair of pulse repetition frequencies, the combination comprising means for operating a transmitter of said system at a successive one of a preselected plurality of pulse repetition frequencies for a preselected number of successive pulse repetition intervals;

doppler processing means responsive to target echo signals received by a receiver of said system for providing at least a pair of clutter-free range trace signals, each said range trace signal indicative of the system response to a mutually exclusive one of said pulse repetition frequencies; and correlation means for time-domain correlation of said pair of range trace signals as a function of discrete time $n\Delta T$, and comprising a plurality of coincidence detection means for comparing one of said range trace signals and a delayed second one of said range trace signals, a successive one of said plurality of coincident detection means employing a successively increased delay ($n\Delta T$) of said delayed second range trace signal, where n is an integer number including zero and where $\Delta T$ corresponds to the time difference between the pulse repetition intervals associated with said pair of pulse repetition frequencies, whereby the true range time of the target may be determined as the sum of the apparent range time and that delay ($n\Delta T$) associated with the registry coincidence of a portion of said one of said range trace signals with a portion of said delayed other one of said range trace signals.

* * * * *